(12) United States Patent
Porter

(10) Patent No.: US 6,988,854 B2
(45) Date of Patent: Jan. 24, 2006

(54) CABLE DISPENSER AND METHOD

(75) Inventor: David R. Porter, Huntsville, AL (US)

(73) Assignee: Sanmina-SCI Corporation, Huntsville, AL (US)

( * ) Notice: Subject to any disclaimer, the term of this patent is extended or adjusted under 35 U.S.C. 154(b) by 130 days.

(21) Appl. No.: 10/074,321

(22) Filed: Feb. 12, 2002

(65) Prior Publication Data

US 2003/0113092 A1 Jun. 19, 2003

Related U.S. Application Data

(60) Provisional application No. 60/340,416, filed on Dec. 14, 2001, and provisional application No. 60/340,624, filed on Dec. 14, 2001.

(51) Int. Cl.
*F15L 1/16* (2006.01)
*B65H 49/00* (2006.01)

(52) U.S. Cl. ............... 405/165; 405/177; 242/387; 242/390.2; 242/403; 242/418.1; 242/557; 242/566; 242/593

(58) Field of Classification Search ............ 405/174, 405/177, 164, 165, 159; 242/387, 566, 418.1, 242/403, 557, 390.2; 37/313
See application file for complete search history.

(56) References Cited

U.S. PATENT DOCUMENTS

| | | | |
|---|---|---|---|
| 1,748,283 A | | 2/1930 | Filby |
| 2,155,044 A | * | 4/1939 | Gray et al. ............. 405/181 |
| 2,663,515 A | * | 12/1953 | Kinsinger ............. 242/566 |
| 2,692,092 A | * | 10/1954 | Kinsinger ............. 242/566 |
| 3,148,863 A | | 9/1964 | Peterson et al. |
| 3,322,372 A | | 5/1967 | Hellstrom |
| 3,400,524 A | * | 9/1968 | Davis ............. 242/390.2 |
| 3,484,054 A | * | 12/1969 | James et al. ............. 242/128 |
| 3,700,180 A | | 10/1972 | Sitz |
| 3,753,342 A | | 8/1973 | Yoshitaka et al. |
| 3,788,575 A | * | 1/1974 | Boettcher et al. ............. 242/403 |
| 3,840,713 A | | 10/1974 | Carpentier |
| 3,889,896 A | | 6/1975 | O'Hara |
| 4,312,496 A | | 1/1982 | Norminton |
| 4,389,088 A | | 6/1983 | Trezequet |
| 4,410,297 A | * | 10/1983 | Lynch ............. 405/164 |
| 4,463,911 A | * | 8/1984 | Beach ............. 242/557 |
| 4,890,957 A | * | 1/1990 | Rinas ............. 405/174 |
| 5,257,746 A | | 11/1993 | Norrvi et al. |
| 5,402,959 A | | 4/1995 | Wadle |
| 5,722,793 A | * | 3/1998 | Peterson ............. 405/164 |
| 5,727,373 A | | 3/1998 | Appleford et al. |
| 5,887,815 A | | 3/1999 | Pierce |
| 5,971,665 A | * | 10/1999 | Hughes ............. 405/159 |
| 6,516,892 B2 | * | 2/2003 | Reilly ............. 242/387 |

FOREIGN PATENT DOCUMENTS

EP 0919458 A1 6/1999

* cited by examiner

*Primary Examiner*—Michael Safavi
(74) *Attorney, Agent, or Firm*—Perkins Coie LLP

(57) ABSTRACT

Fiber-optic cable is dispensed underwater into a trench from a vehicle moving along the bed of the body of water. The cable is wound on a stationary spool and dispensed over the end of the spool by a rotary arm driven by a motor controlled to maintain a desired tension in the cable. The cable has a fiber optic core, metal wires wound around the core, and a tensioned laminate of copper tape adhered to plastic tape wound around the wires.

13 Claims, 3 Drawing Sheets

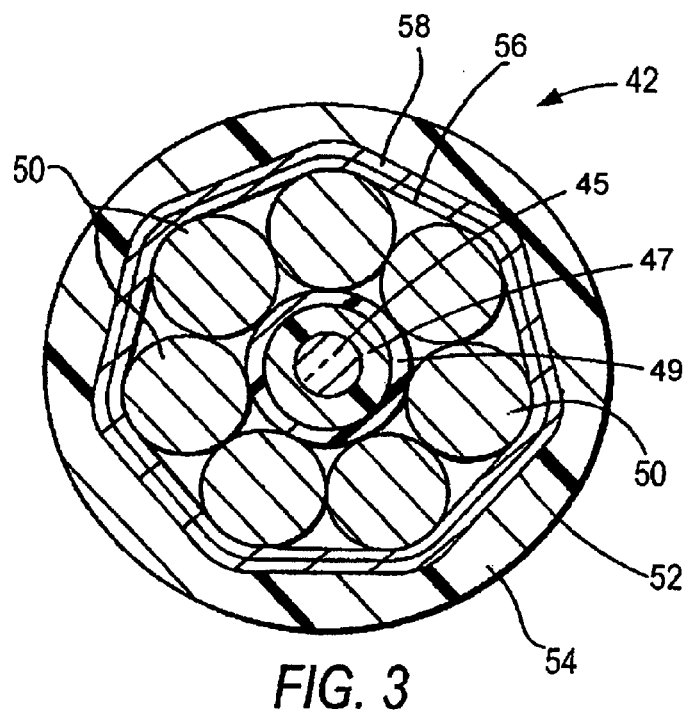
FIG. 3
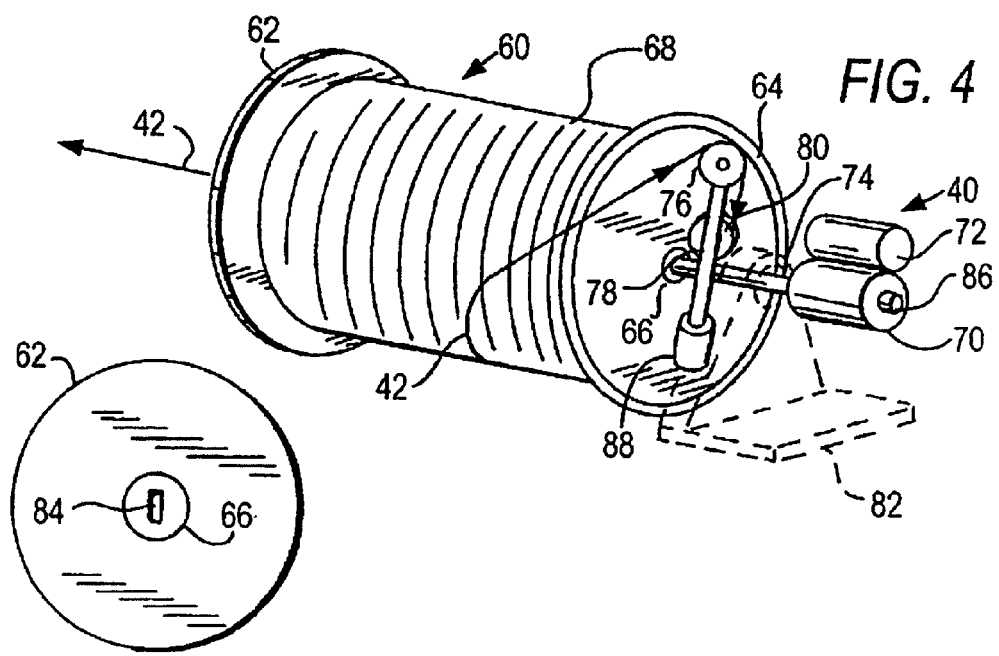
FIG. 4
FIG. 5

CABLE DISPENSER AND METHOD

This application claims benefit of provisional applications Nos. 60/340,416 and 60/340,624, both filed Dec. 14, 2001.

This invention relates to undersea cable, particularly fiber-optic cable, and to equipment and methods for dispensing and laying such cable, and to communications networks using such cable.

There is an ever-increasing need for the transmission of data, voice, video and other signals under water.

One source of such need is the proliferation of off-shore oil exploration and production rigs, and the needs for scientific, business, personnel, and other communications including remote sensors and remotely controlled equipment from manned or unmanned and surface or submerged off-shore structures, platforms, and facilities.

It has been attempted to provide a fiber-optic communication network linking numerous oil-rigs with land-based stations. However, the undersea portion of such a network has presented numerous challenges and problems.

One problem with prior undersea fiber-optic cable communication lines lies in the insufficiency of the cable to withstand the conventional installation method of deployment from a surface ship through the water column to the bottom and burial of the cable at a later time. Often, the cable provided in the past has not been sufficiently robust. If sufficiently robust, it has been undesirably heavy and expensive.

Accordingly, one of the objects of the invention is to provide an underwater fiber-optic cable which solves or alleviates the foregoing problems, and particularly a cable which is relatively light-weight but robust and flexible, and resistant to environmental attacks, such as by chewing fish and other sea life.

Other problems lie in the laying of the cable, and particularly in the dispensing of the cable while laying it.

It has been proposed to lay such cable by using a remotely-controlled crawling vehicle or tractor to pull a sled with a trenching mechanism which digs a narrow trench in the seabed and dispenses the cable into the trench.

One problem which has been recognized by the inventor herein is that the weights and electric power requirements for most prior cable dispensers are higher than they need be. One reason for this is that prior dispensing motors often must be relatively large to handle the loads required in dispensing very long (e.g., 100 miles long) segments of cable. Both the initial cost and the operating costs for such equipment are inordinately high.

Accordingly, it is another object of the invention to provide a cable dispensing system and method which alleviate the foregoing problems, and, in particular, a system and method which is relatively compact and light-weight, which requires significantly less power to operate, and whose initial cost is lower than that of comparable prior systems and methods.

In accordance with the present invention, the foregoing objectives are satisfied by the provision of a cable having a fiber-optic core with a plurality of metal wires wrapped around the core to give strength and cut-resistance, and a laminate of a tensioned metal tape and a plastic tape, wrapped about the wires under relatively high tension. The resulting tensioned laminate is believed to compress the wires and core and hold them together while not adding unacceptably to the cable diameter, and to otherwise improve the cable.

In the dispensing apparatus and method of the invention, a long length (e.g. 100 miles) of fiber-optic cable is wound on a spool or reel. The spool is mounted to be stationary on a support structure such as an undersea sled, and the cable is dispensed by pulling the cable longitudinally over one of the end flanges with cable tension being controlled by a motor.

Preferably, the motor drives a relatively light-weight arm which guides the cable over the end flange of the spool.

Also, it is preferred to guide the cable through the hollow center of the spool so that the cable exits through the rear flange of the spool.

The cable is given a reverse twist as it is wound so that it does not twist or become tangled as it is unwound.

The spool is supported by securing it at the rear end to an external support, and by means of a shaft entering the other end of the hollow center of the spool. This same shaft is used as a drive member to rotate the dispensing arm.

Tension control and revolution counting also are provided, to keep the feeding of the cable steady, and to provide an indication of the length of cable dispensed.

The cable of the invention has special utility when used with the dispenser of the invention in that it has the desired robustness, stability and light weight, while also being sufficiently flexible and elastic to endure the reverse twist and often sharp bends which can be experienced in moving through the dispenser.

The foregoing and other objects and advantages of the invention will be set forth in or made apparent from the following description and drawings.

IN THE DRAWINGS

FIG. 3 is a cross-sectional view of a cable constructed in accordance with the present invention;

FIG. 4 is a perspective view of a cable dispensing device constructed in accordance with the present invention;

FIG. 5 is a rear end elevation view of the device shown in FIG. 4;

Network

Figure 1:
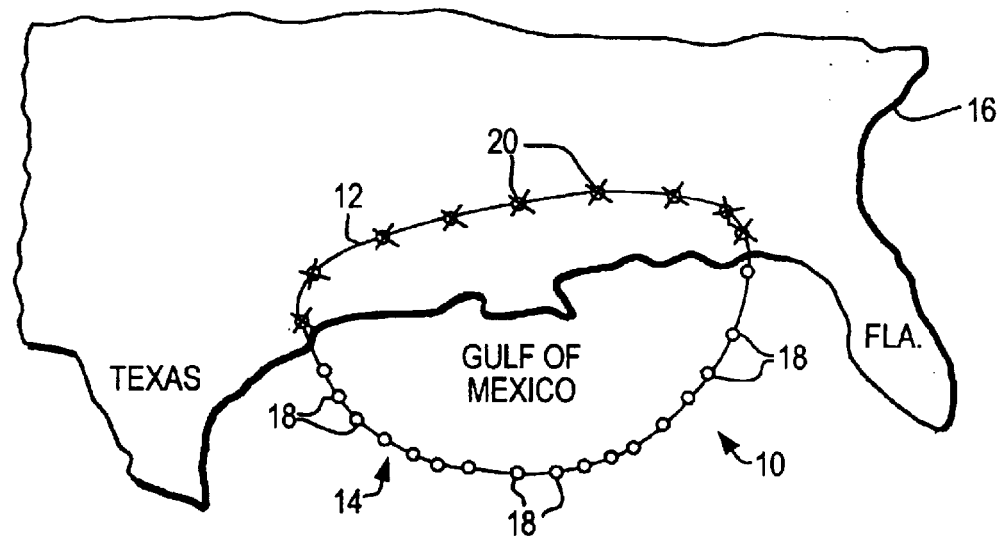
FIG. 1 is a schematic view of a fiber-optic cable telecommunications network using the present invention.

The undersea cable is intended for use in the undersea portion of a fiber-optic cable communications network 10 shown in FIG. 1. The network 10 has a portion 12 on land and a second portion 14 undersea. The network is connected to land-based stations 20, and to towers 18 such as oil well rigs 18 extending above the surface of the ocean. The network is shown schematically superimposed on a map 16 of the southeastern portion of the U.S.A. and the Gulf of Mexico. The network will provide badly needed low-cost, high volume data and voice communications to and from offshore oil rigs.

Figure 2:
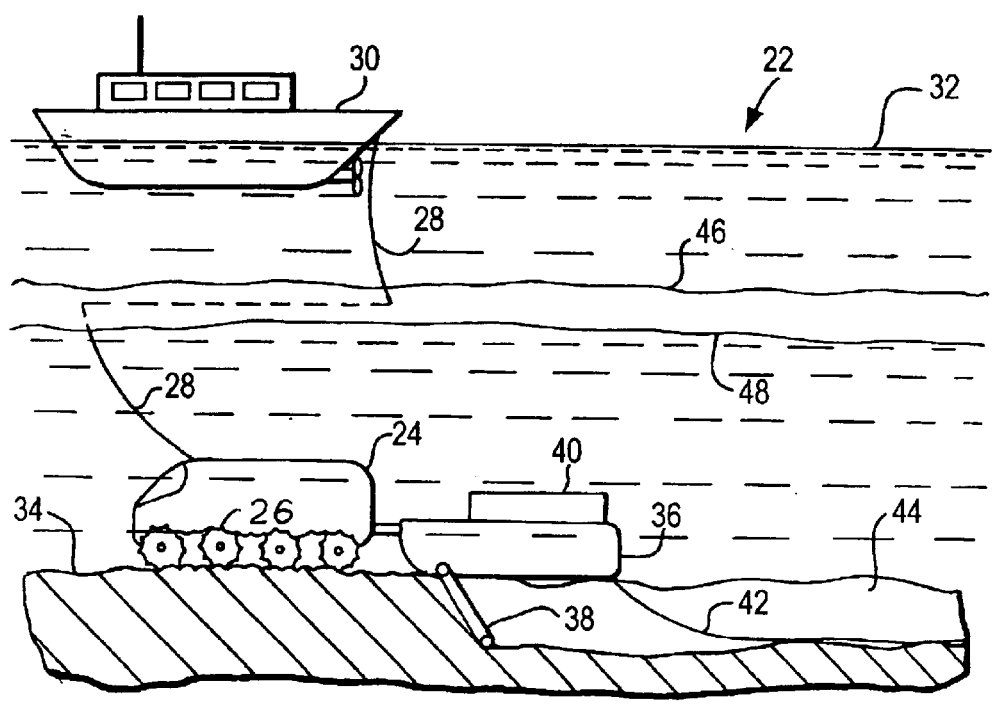
FIG. 2 is a schematic view of an underwater cable laying system utilizing the present invention.

FIG. 2 shows schematically the arrangement used to lay the cable 42 beneath the bottom 34 of the ocean to form the undersea portion of the network 10.

An underwater vehicle or tractor 24 with tracks 26 is used to pull a sled 36 along the seabed 34. The sled 36 has a trencher mechanism 38 which forms a narrow trench 44 three to ten feet deep in the seabed. The sled has a cable dispenser 40 which lays the fiber-optic cable 42 in the trench, and the trench is filled in to cover the cable. The cable emerges from the seabed at each tower 18 and is connected to communications 63 equipment on the oil rig.

The vehicle 24 and the sled receive power and command data from and deliver data to a tender ship 30 floating on the surface 32 of the ocean. The water column is shown broken at 46 and 48 to indicate the extreme depth (e.g., up to 900 feet or more) of the water in which the cable can be laid.

Cable

The cable 42 to be laid using the cable-laying system described above is shown in cross-section in FIG. 3.

The cable 42 includes a fiber optic cable 45, with the usual cladding, a primary buffer layer 47 of Hytrel, a secondary buffer layer 49 of nylon, and seven helical-wound wires 50 made of Inconel or some other corrosion-resistant metal. The wires are wound with a right hand lay and are provided to strengthen the cable.

Wound around the wires 50 is a metallic tape 52 and an extruded plastic jacket 54 made of Hytrel.

The construction of the cable is believed to be known except for the use of metallic tape 52. This tape is formed by laminating thin (about 1 mil thick) copper tape to a Mylar tape of the same thickness, and wrapping the tape around the wires 50 under high tension; almost to the breaking point of the tape laminate.

Materials other than copper and Mylar can be used. The metal should have good malleability, and the plastic material should be tough and stable.

This improvement provides additional hoop-strength and compresses and helps hold the wires 50 in place without unduly increasing the diameter of the cable. This gives the cable excellent stability, and makes the cable elastic but resistant to torsional creep, kinking and hockling.

The cable has especially good characteristics for use with the dispenser and method of the invention in which the cable is given a reverse twist during winding, and then is bent rather sharply during dispensing.

Dispensing Mechanism

The cable dispensing mechanism 40 is shown in FIGS. 4 and 5.

The cable 42 is wound on a spool 60 having a rear flange 62 and a front flange 64 with a rounded outer edge. The dispenser 40 is mounted on the sled so as to be stationary. This is done by means of a support 82 shown in dashed lines at the front end, and another structure (not shown) at the other end.

The cable is wound on the reel with a reverse twist, one revolution of the cable for each revolution of the spool, in order to compensate for the twist given to the cable during dispensing and ensure the cable will be straight when dispensed.

Desirably, a relatively long length (e.g., 100 miles) of cable is wound on the reel 60 to enable the efficient laying of cable with a minimum of splicing and raising and lowering of reels from and to the seabed.

The diameter of the cable is only around a little over 0.08 inch. Nonetheless, the weight of 100 miles of the cable is substantial—around 4,000 pounds or more. This weight would cause severe problems using an ordinary spool which rotates about its axis to dispense cable. The motor needed to rotate the spool would be unduly large and expensive both to buy and to operate, and would make the dispenser even heavier, thus increasing the power required of the tractor 24 to pull the sled.

In accordance with the present invention, such problems are minimized by holding the spool stationary and rotating a relatively lightweight mechanism to dispense the cable.

The lightweight mechanism comprises a relatively small electrical drive motor 70 rotating a shaft 74 on bearings in the support 82 and in the hollow center of the spool.

An arm 78 is secured to the shaft 74. Rotatably mounted on one end of the arm 78 is a first pulley or sheave 76, a second pulley or sheave 80, and a counterweight on the opposite end of the arm. The first sheave 76 rotates about an axis at an angle of about 45° with the longitudinal axis of the spool, and the second sheave 80 rotates about an axis perpendicular to that longitudinal axis.

The cable 42 is pulled off of the large roll 68 by rotation of the arm. The cable moves on and is guided by the sheaves 76 and 80 downwardly and into the hollow center of the shaft 74 and the hollow center 66 of the spool and out through the rear flange 62, and then into the trench in the seabed.

A tension sensor 84 (FIG. 5) is mounted near the exit end of the hollow enter of the spool 60 and senses the tension in the cable 42 being dispensed and develops a corresponding electrical signal. The signal is sent to a water-tight sealed control unit 72 which controls the operation of the drive motor 70 to maintain a substantially constant tension on the cable to minimize breakage or snarling of the cable.

A shaft-position encoder 86 counts the revolutions of the drive motor and sends corresponding information signals to the control unit 72 which sends this information to the tender 30 through the cable 28.

Electrical power for the motor 70 and other electrical components of the dispenser unit 40 is delivered through the cable 28 from the tender 30.

The dispenser saves a substantial amount in both weight of initial equipment and operating cost as compared with known prior art devices.

The spool or reel 60, when loaded with cable, should be supported so that the rounded front flange rim 64 is separated from the supporting structure so as to enable the cable 42 to pass over the edge 64. This can be accomplished by securely attaching the rear flange 62 to a strong support structure. This would result in the spool extending like a cantilever beam from that support structure. This may require a construction that is unnecessarily massive and more vulnerable to failure than need be.

Therefore, in accordance with the present invention, the front end of the spool is supported by the shaft 74 which extends into the hollow interior 66 of the spool 60.

Figure 6:
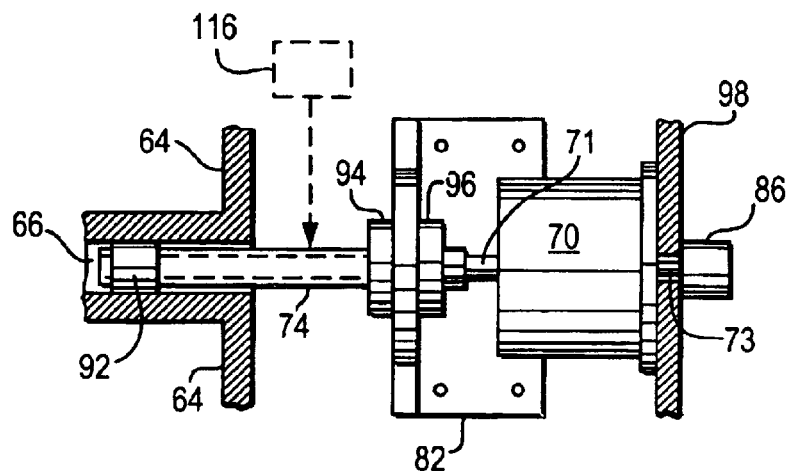
FIGS. 6 and 7 are partially schematic cross-sectional views of portions of the device shown in FIGS. 4 and 5.

Referring now to FIG. 6 as well as FIG. 4, the shaft 74 rests at one end on support 82 and rotates on two sets of bearings 94 and 96. The left portion of shaft 74 also turns on bearings 92 inside the hollow interior 66 of the spool. Thus, the spool is supported at both ends and a cantilever mounting is avoided.

As it is shown in FIG. 6, the motor 70 is mounted on a vertical support plate 98 (not shown in FIG. 4), and has a drive output shaft 71 coupled to rotate the shaft 74. (The arm 78 and pulleys 76 and 80 are omitted from FIG. 6 for the sake of clarity in the drawings.)

A second output shaft 73 extends through a hole in the plate 98 to drive a counter 86, such as a shaft position encoder, to count the revolutions of the drive motor 70 to produce an output signal indicating the number of revolutions of the spool 60, and, hence, the length of cable which has been dispensed.

Figure 9:
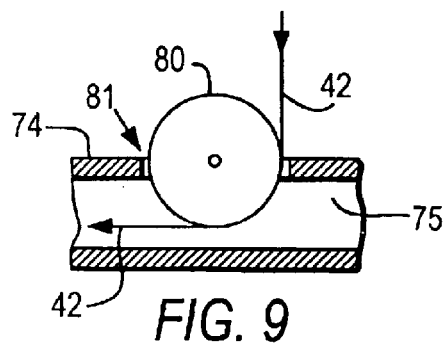
FIG. 9 is a partially schematic cross-sectional view of a portion of the structure shown in FIG. 4.

The shaft 74 is hollow and, as it is shown in FIGS. 4 and 9, the lower sheave 80 fits partway into the shaft through a slot 81 so that the cable 42 passing over the sheave 80 enters the hollow interior 75 of the shaft 74 and ultimately exits from the hollow center of the spool flange 62.

Figure 7:
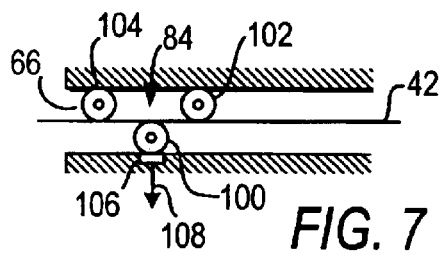

FIG. 7 shows schematically the cable tension detector 84. It consists of a pair of spaced-apart rotatably mounted pulleys or rollers 102 and 104 contacting the cable 42 on one side, and a third pulley or roller 100 urged against the opposite side of the cable 42 at a location between rollers 102 and 104. The roller 100 is urged against the cable 42 by a spring or hydraulic piston (not shown) with a pre-determined force.

The deflection of the cable 42 by the roller 100 is a function of the tension in the cable. The position of the roller 100 is detected by a conventional electronic position sensor 106 which sends a signal over a line 108 to the control unit 72, as it is shown in FIG. 8.

Figure 8:
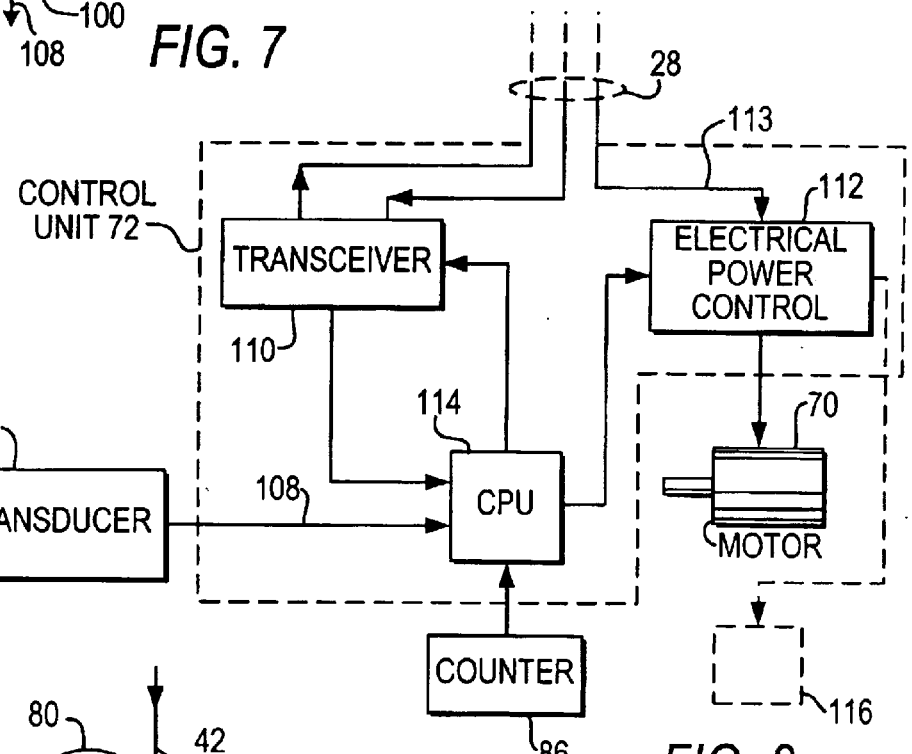
FIG. 8 is a schematic circuit diagram used in operating the preferred embodiment of the invention.

FIG. 8 shows the basic components of the control unit 72. It includes a microprocessor 114, a transceiver unit 110 for transmitting data to and receiving data and command signals from the tender 30 (FIG. 1) through the cable 28. An electrical power control unit 112 receives electrical power from the tender 30 through a power conductor pair represented by the line 113, and, under the control of the microprocessor 114, supplies power to the motor 70.

Stored in the memory of the CPU 114 (or in an auxiliary memory, if needed) is data representing a desired tension level for the cable 42, and a program for comparing the signal from the tension detector 84 with the signal representing the desired tension level. The microprocessor develops an output signal which is a function of the difference between the measured and desired tension levels, and sends that signal to the power control unit 112 which delivers power to the motor 70 so as to run at a speed sufficient to correct the cable tension to the desired level.

If the dispensing of cable is to be stopped, then the power to the motor is adjusted to the level necessary to hold the cable taut with the desired tension. Alternatively, an electro-mechanical brake (shown schematically at 116 in FIG. 6) can be engaged to hold the cable taut to prevent the static energization of the motor 70, and the motor re-energized when dispensing is to resume.

The actual measured cable tension is continuously transmitted to the tender 30 to allow close monitoring of that quantity.

The counter 86 sends a revolution count to the microprocessor 114, which transmits a corresponding signal, by way of the transceiver 110, to the tender 30 to indicate the length of cable dispensed.

If desired, suitable look-up tables or algorithms can be stored in memory for calibrating and converting the tension detector and counter output signals into proper form for transmission to the tender 30.

Advantageously, because the arm 78 has a constant radius, the cable dispensed per revolution is constant, despite the fact that the radius of the cable pack wound on the spool 60 varies widely during the dispensing of a full spool of cable.

Also, advantageously, when it is necessary to change the desired cable tension level, this can be done simply by sending a command signal from the tender through the cable 28.

The electro-mechanical brake can be engaged automatically when a pre-determined time after rotation of the motor 70 has stopped, and released when the motor 70 re-starts. The motor movement or lack thereof can be detected by the shaft position encoder 86.

If desired, special brake command signals can be sent from the tender 30 through the cable 28.

Although it should be apparent from the foregoing, all of the components of the dispenser should be made of materials highly resistant to salt water corrosion and the high water pressures existing at the depth anticipated for the laying of cable—e.g., up to 6,000 feet.

Similarly, all motors, brakes, controllers, transducers and other electrical components should be housed in high-pressure proof housings, and should be pre-lubricated so that the dispensing unit can remain immersed for long periods of time without malfunction or maintenance.

The control of cable tension is very valuable because this is believed to largely prevent the possibility of "loose turns" on the spool, and other sources of tangling of the cable being dispensed. This is very valuable because of the depth at which the dispenser must operate, and the cost and time required to retrieve or otherwise repair a malfunctioning dispenser.

The guiding of the cable through the hollow center of the spool and the support for the free end of the spool help to conserve precious space and reduce the weight and cost of the dispenser system.

It should be understood that the invention is not limited to use under oceans but can be used under many different types of water, whether fresh or salt water.

Although it is preferred to bury the cable in the bed of the body of water, it is not necessary to do so in all cases.

The dispensing mechanism is not limited to dispensing fiber-optic cable, but can dispense electrical or other types of cable, too.

The invention is not limited to use underwater. The invention can be used wherever the advantages described above make it particularly suitable for a cable-dispensing and cable laying situation, whether on dry land or underwater.

The above description of the invention is intended to be illustrative and not limiting. Various changes or modifications in the embodiments described may occur to those skilled in the art. These can be made without departing from the spirit or scope of the invention.

What is claimed is:

1. An underwater cable laying device for laying cable in a trench in an underwater substrate, said device comprising:

a movable support structure for supporting said cable dispenser above said trench and for traveling on said substrate along said trench;

a cable dispenser mounted on said support for dispensing cable into said trench;

said dispenser comprising an elongated stationary spool having at least one end flange, said spool being mounted on said support structure so as to leave said one end flange free of obstructions to the movement of the cable off of said spool over said flange, and wherein said spool has a hollow center and including a guide structure for guiding said cable off of said spool, and into and through said hollow center;

a waterproof powered dispensing mechanism for withdrawing cable from said spool in the general direction of the longitudinal axis of said spool over said flange while controlling the tension on said cable and directing said cable into said trench.

2. A device as in claim 1 including a tension control mechanism for controlling the dispensing of the cable so as to maintain a substantially constant tension in the cable.

3. A device as in claim 1 including a counter for counting the revolutions of said spool and transmitting corresponding signals to indicate the length of said cable dispensed.

4. A device as in claim 1 including an underwater motive mechanism for moving said support structure along said underwater substrate, said dispenser being adapted to dispense said cable as said support structure moves.

5. A device as in claim 1 in which said powered dispensing mechanism includes an arm rotatably mounted on said support structure and having at least one friction-reducing guide for guiding cable off of said spool, and a drive motor for rotating said arm with a control system to control the speed of said motor so as to maintain a desired tension in said cable.

6. A device as in claim 1 in which said cable includes a fiber optic core with a plurality of metal wires wound around said core, and a laminate comprising a tensioned metal tape laminated with a plastic tape, said laminate being wrapped around said metal wires.

7. A device as in claim 1 in which said cable is reverse-twisted when wound on said spool to compensate for the twist imparted to said cable during dispensing.

8. A device as in claim 1 in which said spool has an axially-extending central opening, and a vertical support member for supporting said spool adjacent said one end flange, and a shaft rotatably mounted at one of its ends on said support member and rotatably mounted at the other of its ends in said central opening in said spool.

9. A device as in claim 1 including a surface vessel and a cable extending from said vessel to said dispenser to supply electrical power to and provide communications with said dispenser.

10. A cable laying device for laying cable in a trench in a substrate, said device comprising:

a moveable support structure for supporting said cable dispenser above said trench and for traveling on said substrate along said trench;

a cable dispenser mounted on said support for dispensing cable into said trench;

said dispenser comprising an elongated stationary spool having at least one end flange, said spool being mounted on said support structure so as to leave said one end flange free of obstructions to the movement of cable off of said spool over said flange;

a powered dispensing mechanism for withdrawing cable from said spool in the general direction of the longitudinal axis of said spool over said flange while controlling the tension on said cable and directing said cable into said trench; and wherein said spool has a hollow central conduit and said cable withdrawing mechanism has a rotary mounted dispensing arm with guide rollers for guiding said cable over the edge of said flange and through said central conduit to exit at the end opposite the end at which said flange is located.

11. A device as in claim 10, including a detector for measuring the tension in said cable, a comparator for comparing the tension measured by said detector with a pre-determined tension and adjusting said withdrawing mechanism to correct any difference between said measured tension and said pre-determined tension.

12. A device as in claim 10 in which said spool has a hollow central conduit, said withdrawing mechanism has a rotary mounted dispensing arm mounted to rotate about said conduit, an upright support member, a shaft rotatably mounted adjacent one of its ends to said upright support member, and the opposite one of its ends extending into said conduit and being rotatably supported therein, said arm being secured to said shaft to rotate therewith, and a drive motor for rotating said shaft.

13. A device as in claim 12 including a revolution counter for counting the revolutions of said arm.

* * * * *